(12) United States Patent
Gates et al.

(10) Patent No.: US 6,654,853 B1
(45) Date of Patent: *Nov. 25, 2003

(54) METHOD OF SECONDARY TO SECONDARY DATA TRANSFER WITH MIRRORING

(75) Inventors: Dennis E. Gates, Wichita, KS (US); Scott E. Greenfield, Wichita, KS (US)

(73) Assignee: LSI Logic Corporation, Milpitas, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 816 days.

(21) Appl. No.: 08/772,443

(22) Filed: Dec. 23, 1996

(51) Int. Cl.[7] ................ G06F 12/00; G06F 13/12
(52) U.S. Cl. ............... 711/114; 711/118; 711/154; 710/22; 710/39; 710/17
(58) Field of Search .................. 711/100, 101, 711/111–114, 146, 1, 6, 118, 154; 714/1, 2, 3, 4, 5, 517; 345/509; 712/39, 17, 22

(56) References Cited

U.S. PATENT DOCUMENTS

| | | | |
|---|---|---|---|
| 5,206,943 A | 4/1993 | Callison et al. | 711/114 |
| 5,287,462 A | 2/1994 | Jibbe et al. | 710/36 |
| 5,353,415 A | 10/1994 | Wolford et al. | 395/325 |
| 5,454,085 A | 9/1995 | Gajjar et al. | 710/105 |
| 5,469,548 A | 11/1995 | Callison et al. | 711/114 |
| 5,488,709 A | 1/1996 | Chan | 711/118 |
| 5,524,268 A | * 6/1996 | Geldman et al. | |
| 5,548,788 A | 8/1996 | McGillis et al. | 395/851 |
| 5,566,331 A | 10/1996 | Irwin, Jr. et al. | 707/10 |
| 5,590,361 A | * 12/1996 | Iwamura et al. | 395/800.32 |
| 5,748,937 A | * 5/1998 | Abramson et al. | 395/394 |
| 5,784,571 A | * 7/1998 | Mantopoulos et al. | 395/200.77 |
| 5,822,553 A | * 10/1998 | Gifford et al. | 710/305 |

FOREIGN PATENT DOCUMENTS

| | | | | |
|---|---|---|---|---|
| WO | WO 92/19058 | * | 10/1992 | H04L/12/46 |
| WO | WO 98/28679 | * | 7/1998 | G06F/13/12 |

* cited by examiner

*Primary Examiner*—Pierre-Michel Bataille
(74) *Attorney, Agent, or Firm*—Carstens, Yee & Cahoon, LLP

(57) ABSTRACT

Data transfers from the peripheral interface of a disk array to a data buffer are snooped to determine if the starting address of a data transfer matches an entry in a list of starting addresses for requested data. If a match is identified, third party transfer is initiated and the data is simultaneously transferred to the host interface of the host system. The resulting data bandwidth is increased. A throttling/suspension mechanism can temporarily or indefinitely hold up actual data movement into the data buffer to allow for temporary buffering and interface speed matching as data is transferred to the host interface.

36 Claims, 6 Drawing Sheets

METHOD OF SECONDARY TO SECONDARY DATA TRANSFER WITH MIRRORING

BACKGROUND OF THE INVENTION

1. Technical Field

The present invention relates generally to transferring data in data processing systems and in particular to transferring data from a disk array to a host in a data processing system. Still more particularly, the present invention relates to transferring data from a peripheral interface for a disk array in a data processing system into a main data buffer and out to a host interface with a simple suspend/throttle control scheme.

2. Description of the Related Art

Redundant arrays of inexpensive disks (RAID) such as small SCSI hard disks, have been found to be suitable alternatives to large capacity, single magnetic media. Such arrays appear to the host system as a single media, but provide a very high data transfer rate through a technique called "striping." The arrays also provide improved reliability, scalability, data availability and power consumption over large magnetic disks.

Control of the array for READ, WRITE, and other operations may be performed by the host, but is typically effected by a controller. Controllers generally utilize a data buffer between the host and the array, transferring data from the array to the data buffer and from the data buffer to the host.

Current implementations of buffered controllers support non-cached disk READ operations by performing high-speed data movement between a peripheral interface and a main data buffer and between a main data buffer and a host interface. The total data transfer is generally accomplished in two distinct operations: the inbound transfer places data read from the peripheral interface of the array into the main data buffer, while the outbound transfer removes data from the main data buffer and forwards it to the host interface.

It would be advantageous to transfer data from the peripheral interface of the array into the data buffer and out to the host interface in a single operation, thereby achieving a higher effective data bandwidth as well as improving the host read data response time.

SUMMARY OF THE INVENTION

Data transfers from the peripheral interface of a disk array to a data buffer are snooped to determine if the starting address of a data transfer matches an entry in a list of starting addresses for requested data. If a match is identified, third party transfer is initiated and the data is simultaneously transferred to the host interface of the host system. The resulting data bandwidth is increased. A throttling/suspension mechanism can temporarily or indefinitely hold up actual data movement into the data buffer to allow for temporary buffering and interface speed matching as data is transferred to the host interface.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
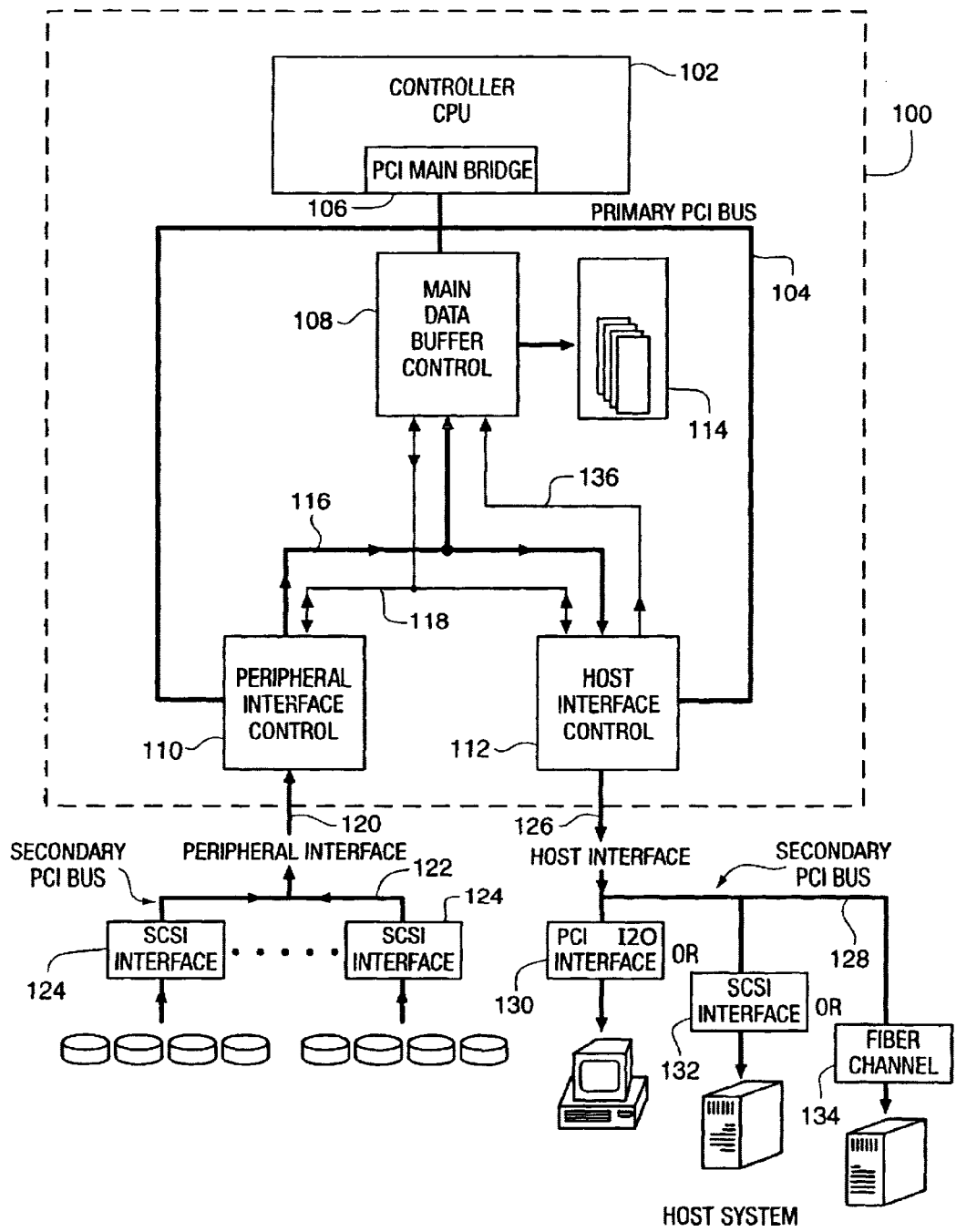
FIG. 1 depicts a data processing system employing a disk array and a controller in accordance with a preferred embodiment of the present invention.

With reference now to the figures, and in particular with reference to FIG. 1, a block diagram of a data processing system employing a disk array and a controller in accordance with a preferred embodiment of the present invention is depicted. Controller 100 comprises controller CPU 102 linked to primary PCI bus 104 by PCI main bridge 106. Primary PCI bus 104 also connects main data buffer control 108 to both peripheral interface control 110 and host interface control 112. Main data buffer control 108 is connected to, and controls data transfer to and from, data buffer 114. Main data buffer control 108 is also linked to both peripheral interface control 110 and host interface control 112 by buffer data bus 116 and main control bus 118.

In operation, peripheral interface control 110 controls the transfer of data from peripheral interface 120 to secondary PCI bus 122, which is connected, for example, by a plurality of SCSI interfaces 124 to the storage media of the disk array. Data read from the storage media is transferred by peripheral interface control 110 into data buffer 114 via buffer data bus 116 and main data buffer control 108. The data may be transferred out of data buffer 114 to host interface control 112 via main data buffer control 108 and buffer data bus 116. Buffer data bus 116 is used to transfer the data itself while main control bus 118 is used to control the transfer and for signaling data request/acknowledge.

Host interface control 112 controls the transfer of data through host interface 126 to secondary PCI bus 128. Secondary PCI bus 128 is connected to the host system by an appropriate interface such as PCI interface 130, SCSI interface 132, or fiber channel interface 134.

As described below, host interface control 112 contains a snooping mechanism to detect transfers of requested data from peripheral interface control 110 to main data buffer control 108. Host interface control 112 also contains a throttling/suspension mechanism, which employs throttling control bus 136 between host interface control 112 and main data buffer control 108 to act as a pacing agent for actual data transfer.

Although depicted separately for clarity in explaining the present invention, those skilled in the art will recognize that buffer data bus 116, main control bus 118, and throttle control bus 136 may employ a single set of conductors and/or pins and that main data buffer control 108, data buffer 114, peripheral interface control 110, and host interface control 112 may be implemented as a single integrated circuit.

While the exemplary embodiment described herein employs a PCI bus, those skilled in the art will recognize that the principles disclosed are applicable to any data transfer from a source to a destination which employs intermediate buffering, regardless of the bus architecture selected.

Figure 2:
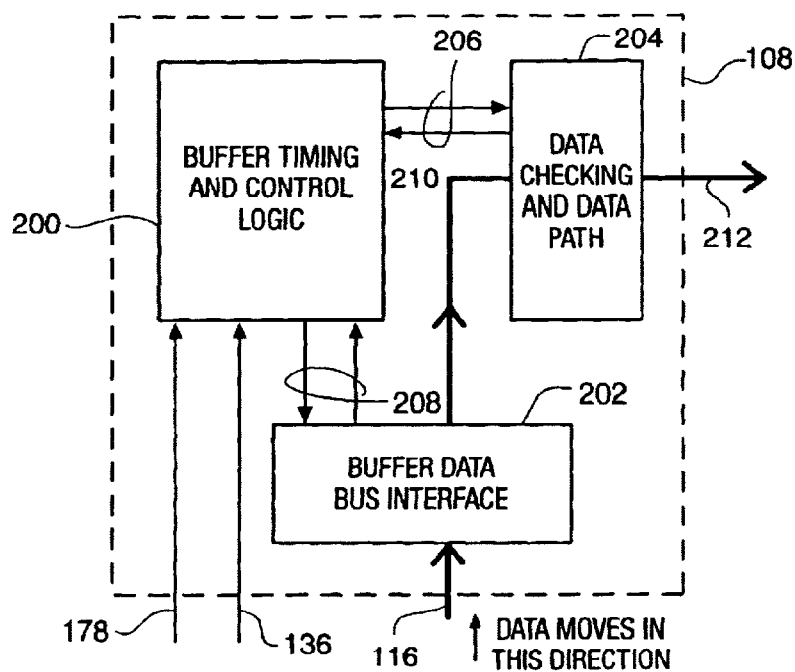
FIG. 2 is a block diagram illustrating further details of the main data buffer control within the controller depicted in FIG. 1.

Referring to FIG. 2, further details of the main data buffer control within the controller depicted in FIG. 1 are illustrated in a block diagram. Main data buffer control 108 regulates data movement from buffer data bus 116 to the actual data buffer. Buffer timing and control logic unit 200, connected to main control bus 118 and throttling control bus 136, contains sequential state machine logic controlling both the timing and assertion of signals to the specific buffer devices and the transfer of data from buffer data bus interface unit 202 to data checking and data path unit 204. Buffer timing and control logic unit 200 handles buffer refresh requirements, timing requirements for various cycle control signals, and address/data transfer requirements relative to the buffer devices in the main data buffer. These tasks are common to most memory control logic such as that used for DRAMs and are not unique to the present invention.

Data checking and data path unit 204 contains registers and steering logic necessary to support movement of data from buffer data bus interface 202 to the data buffer. Control signals for these registers and steering logic are received from buffer timing and control logic unit 200 via signal lines 206. Data is forwarded to the data buffer from data checking and data path unit 204 via data lines 212.

Buffer data bus interface 202 contains hardware providing an immediate interface of control and data bits from buffer data bus 116. This hardware typically includes at least one level of buffering or temporary storage of data bits for transfer from buffer data bus 116 to data checking and data path unit 204. Controls signals for this hardware are received from buffer timing and control logic unit 200 via signal lines 208, while the actual data transfer to data checking and data path unit 204 flows via data lines 210.

With the exception of the input for throttle control bus 136 and attendant circuitry for responding appropriately to signals on throttle control bus 136, main data buffer control 108 may be constructed in accordance with known embodiments of disk array controllers.

Figure 3:
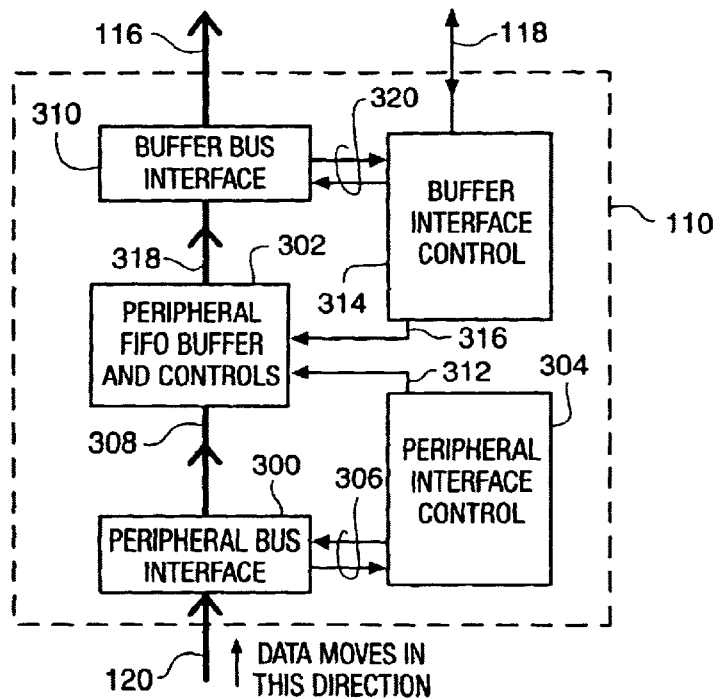
FIG. 3 depicts further details of the peripheral interface control within the controller depicted in FIG. 1.

With reference now to FIG. 3, further details of the peripheral interface control within the controller depicted in FIG. 1 are depicted. Peripheral interface control 110 controls transfer of data from peripheral interface 120 to buffer data bus 116. Peripheral bus interface unit 300 contains hardware providing an immediate interface of control and data bits from peripheral interface 120. This hardware typically includes at least one level of buffering of data bits for transfer to peripheral FIFO buffer and controls 302. Peripheral bus interface unit 300 receives control signals from peripheral interface control unit 304 via signal lines 306 and forwards data to peripheral FIFO buffer and controls 302 via data lines 308.

Peripheral interface control unit 304 contains sequential state machine logic controlling data movement between peripheral interface 120 into peripheral bus interface unit 300 as well as data transfer from peripheral bus interface unit 300 to peripheral FIFO buffer and controls 302.

Peripheral FIFO buffer and controls 302 contains a FIFO (first-in, first-out) buffer and data path steering logic necessary to support efficient movement of input data from peripheral bus interface unit 300 to buffer bus interface unit 310. Control signals for this buffer and steering logic are received from peripheral bus interface unit 300 via signal line 312 and from buffer interface control unit 314 via signal line 316. Data from peripheral FIFO buffer and controls 302 is forwarded to buffer bus interface unit 310 via data lines 318.

Buffer interface control unit 314 contains sequential state machine logic controlling movement of data from peripheral FIFO buffer and controls 302 into buffer bus interface unit 310 and from buffer bus interface unit 310 to buffer data bus 116. Buffer interface control unit 314 sends control signals to buffer bus interface unit 310 via signal lines 320. Buffer bus interface unit 310 provides an immediate interface for control and data bits being forwarded to buffer data bus 116 and typically includes a minimum of one level of buffering of data bits for transfer from peripheral FIFO buffer and controls 302 to buffer data bus 116.

The components of peripheral interface control 110 may be constructed in accordance with known embodiments of disk array controllers. The tasks described are common to data transfers from disk arrays and are not unique to the present invention.

Figure 4:
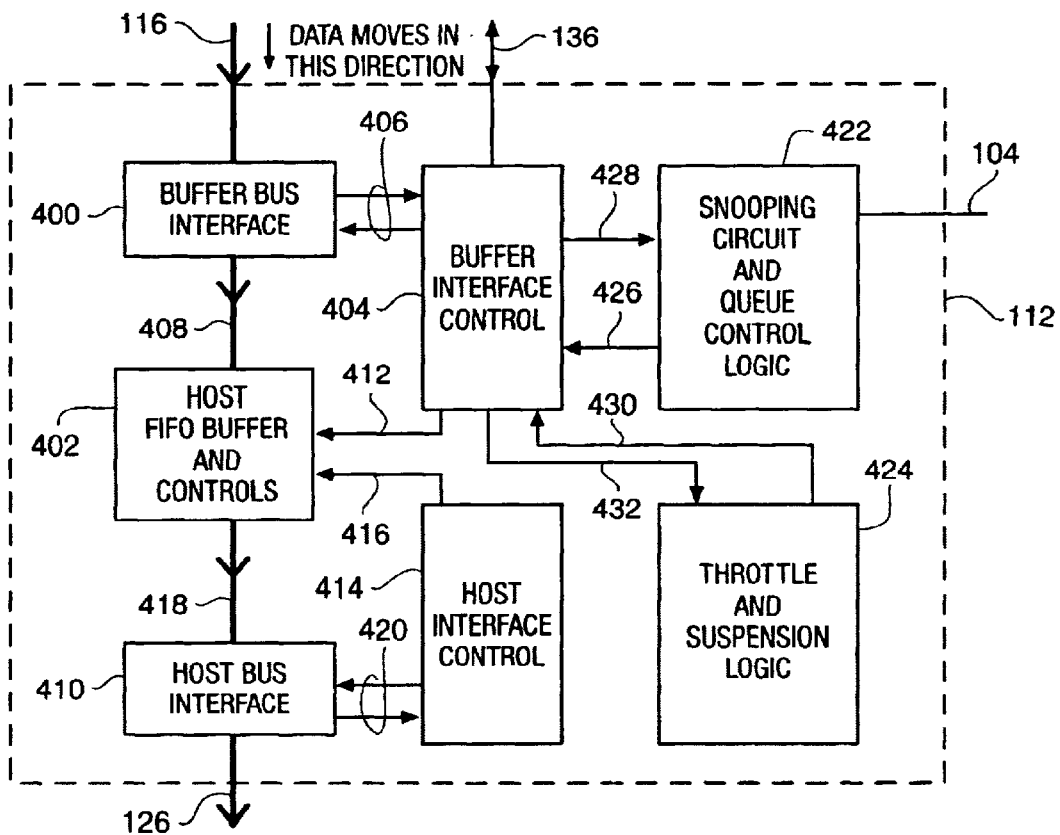
FIG. 4 is a block diagram illustrating further details of the host interface control within the controller depicted in FIG. 1.

Referring to FIG. 4, further details of the host interface control within the controller depicted in FIG. 1 are illustrated in a block diagram. Host interface control 112 controls data transfer from buffer data bus 116 to host interface 126. Buffer bus interface unit 400 contains hardware providing an immediate interface controlling data movement from buffer data bus 116 to host FIFO buffer and controls 402. This hardware typically includes a minimum of one level of buffering of data bits transferred from buffer data bus 116 to host FIFO buffer and controls 402. Control signals for this hardware are received from buffer interface control unit 404 via signal lines 406, while data is transferred from buffer data bus 116 to host FIFO buffer and controls 402 via data line 408.

Host FIFO buffer and controls 402 contains a FIFO buffer and data path steering logic necessary to support efficient movement of input data from buffer bus interface unit 400 to host bus interface unit 410. Controls signals for the buffer and steering logic are received from buffer interface control unit 404 via signal line 412 and from host interface control unit 414 via signal line 416. Data is transferred from host FIFO buffer and controls 402 to host bus interface unit 410 via data lines 418.

Host interface control unit 414 contains sequential state machine logic controlling movement of data from host FIFO buffer and controls 402 to host bus interface unit 410 and from host bus interface unit 410 to host interface 126. Control signals are sent from host interface control unit 414 to host bus interface unit 410 via signal lines 420. Host bus interface unit 410 contains hardware providing an immediate interface of control and data bits to host interface 126. This hardware typically includes at least one level of buffering of data bits transferred from host FIFO buffer and controls 402 to host interface 126.

With the exception of snooping circuit and queue control logic 422, throttle and suspension logic 424, and modifications to buffer interface control unit 404, as described below, the components of host interface control 112 may be constructed in accordance with known embodiments of disk array controllers. The tasks described are common to data transfers from disk arrays and are not unique to the present invention.

Buffer interface control unit 404 contains sequential state machine logic which, in conjunction with snooping circuit and queue control logic 422 and throttle and suspension logic 424, controls movement of data from buffer data bus 116 into buffer bus interface unit 400 as well as movement of data from buffer bus interface unit 400 into host FIFO buffer and controls 402. Buffer interface control unit 404 also manages throttle control bus 136.

Snooping circuit and queue control logic 422 contains hardware enabling host interface control 112 to participate in data transfers occurring on buffer data bus 116. Snooping circuit and queue control logic 422 includes a hardware queueing mechanism containing a list of potential starting addresses for data transfers on buffer data bus 116. This list of starting addresses can be polled sequentially to allow an effective comparison of all actual data transfer starting addresses to all starting address entries in the queue.

If snooping circuit and queue control logic 422 detects a match between an actual data transfer starting address and a starting address in the queue, it signals buffer interface control unit 404 to initiate transfer of the data on buffer data bus 116 into buffer bus interface unit 400. Thus requested data may be obtained for host interface 126 directly from the peripheral interface control via buffer data bus 116, without first storing the data in the data buffer and subsequently transferring the data via host interface control 112 to host interface 126.

Snooping circuit and queue control logic 422 also includes a device enabling throttle and suspension logic 424 to initiate monitoring and passive control of the current handshake of data transferred from the peripheral interface control to buffer data bus 116 and received by the main data buffer control. Snooping circuit and queue control logic 422 also contains a mechanism determining when a continuation or suspension of a previously queued data transfer is required. This requires some data transfer length detection or counter logic as well as holding registers for suspended or pending transfers considered to be in progress but not currently transferring on buffer data bus 116.

Snooping circuit and queue control logic 422 provides an input to buffer interface control unit 404 via signal line 426 and receives an input from buffer interface control unit 404 via signal line 428. Snooping circuit and queue control logic 422 receives addresses from the CPU on primary PCI bus 104.

Throttle and suspension logic 424 contains logic for determining whether a current data transfer on buffer data bus 116 should be throttled or suspended. Throttle and suspension logic 424 provides an input to buffer interface control unit 404 via signal line 430 for use in managing throttle control bus 136. Throttle and suspension logic 424 receives an input from buffer interface control unit 404 via signal line 432 used in determining if throttling or suspension is required.

Figure 5:
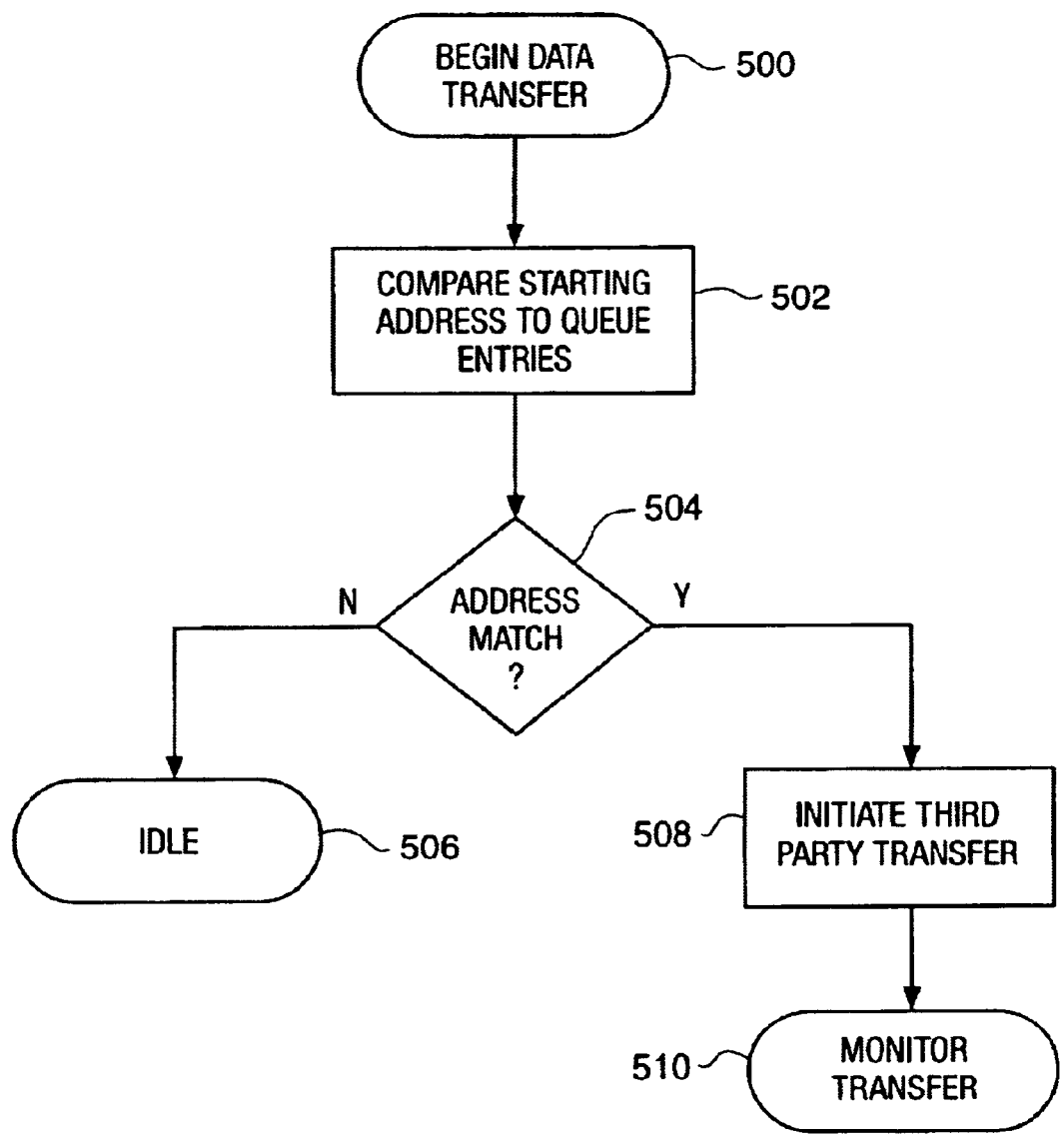
FIG. 5 depicts a high level flowchart for a process in the snooping mechanism for determining if a requested data transfer is occurring in accordance with a preferred embodiment of the present invention.

With reference now to FIG. 5, a high level flowchart is depicted for a process in the snooping mechanism for determining if a requested data transfer is occurring in accordance with a preferred embodiment of the present invention. The process is preferably performed by snooping control circuitry included in the host interface control of a disk array controller. The snooping control circuity includes a queue listing possible data transfer starting addresses, and in particular the starting addresses of requested data transfers.

The process begins at step 500, which depicts the beginning of a data transfer into the main data buffer via the buffer data bus. The process passes next to step 502, which illustrates a comparison of the starting address of the data transfer on the buffer data bus to the list of starting addresses in the queue, and then to step 504, which depicts a determination of whether the starting address of the data transfer matched a starting address in the queue. If not, the process proceeds to step 506, which illustrates the process becoming idle until the beginning of the next data transfer on the buffer data bus. If so, however, the process proceeds instead to step 508, which depicts initiation of third party or "fly-by" data transfer and begin receiving the data as it is transferred from the peripheral interface control to the main data buffer control and data buffer. The process then passes to step 510, which depicts monitoring the data transfer to determine is throttling or suspension is required to allow temporary buffering and interface speed matching as data is transferred to the host interface.

Figure 6:
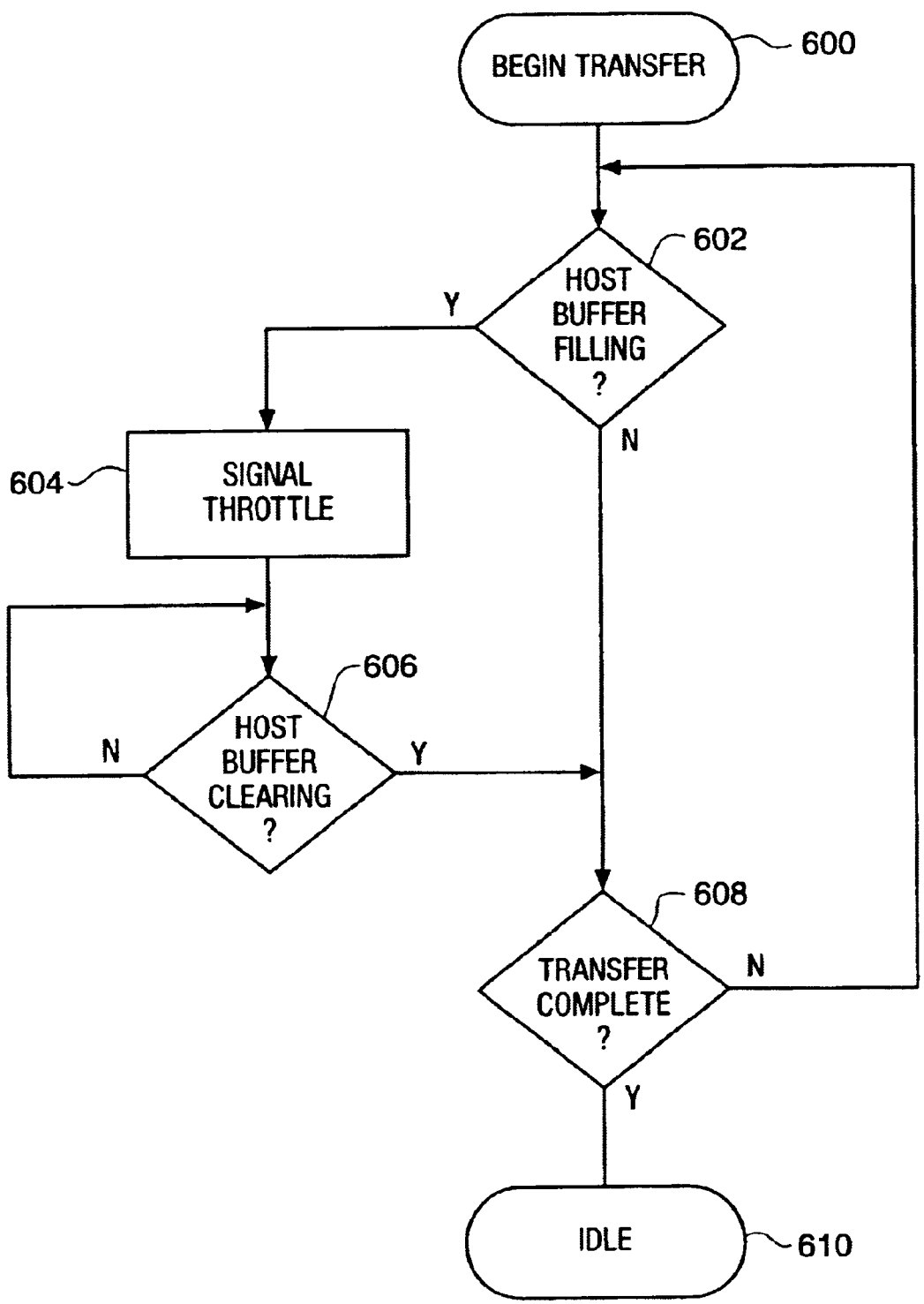
FIG. 6 is a high level flowchart for a process of throttling/suspending data transfer into the controller main data buffer in accordance with a preferred embodiment of the present invention.

Referring to FIG. 6, a high level flowchart for a process of throttling/suspending data transfer into the controller main data buffer in accordance with a preferred embodiment of the present invention is illustrated. The throttling/suspension is preferably effected by a signal from the host interface control to the main data buffer control on the throttle control bus is response to a determination by the throttling mechanism in the host interface control that throttling/suspension is required.

The process begins at step 600, which depicts the beginning of a third party data transfer into the host interface control of data being transferred from the peripheral interface control to the main data buffer. The process then passes to step 602, which illustrates a determination of whether throttling or suspension is necessary due to the host interface buffer filling to a level and/or at a rate which indicates the host system requires additional clock cycles to receive the data already transferred from the peripheral interface control to the main data buffer control. If the host interface buffer is filling, the process proceeds to step 604, which depicts signaling a throttle of the data transfer on the throttle control bus, causing the main data buffer control to assert a signal disabling the data request. The process next passes to step 606, which illustrates a determination of whether the host interface buffer is clearing in response to transfer of data to the host system. If not, the process loops back to step 606 continually until the host interface buffer is sufficiently cleared. If so, however, the process proceeds instead to step 608, described below.

Referring again to step 602, if throttling or suspension is not required, the process passes to step 608, which depicts a determination of whether the data transfer is complete. If not, the process loops back to step 602 to again determine if throttling or suspension is required. if so, however, the process proceeds to step 610, which illustrates the process becoming idle until the next third party data transfer to the host interface buffer begins.

Figure 7A:
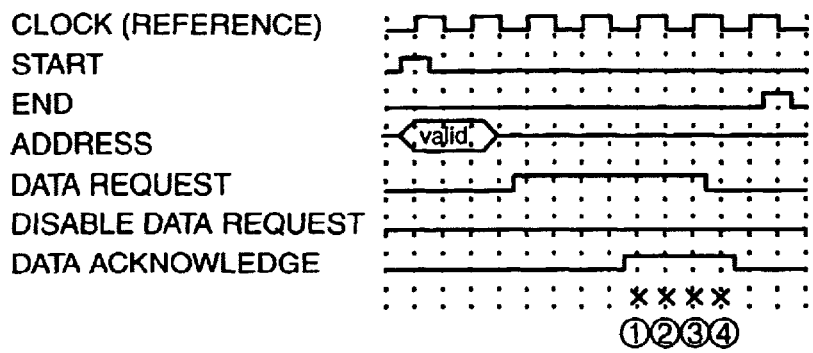
FIGS. 7A–7C depict timing diagrams demonstrating the effect of a throttling/suspension mechanism on data transfer into the data buffer.
Figure 7B:
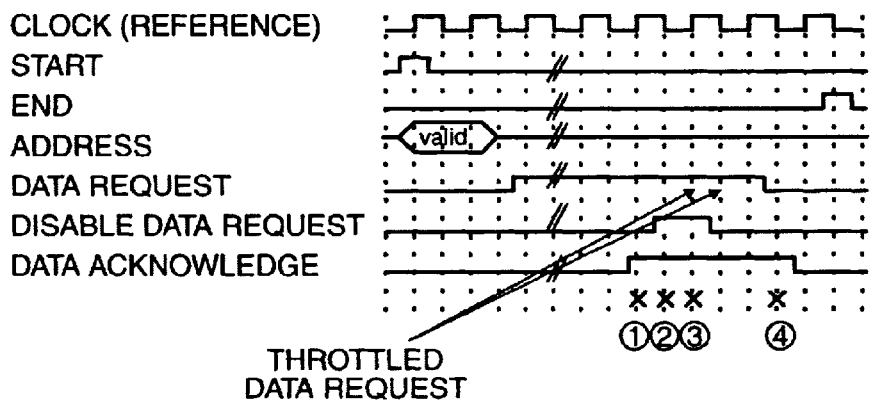
Figure 7C:
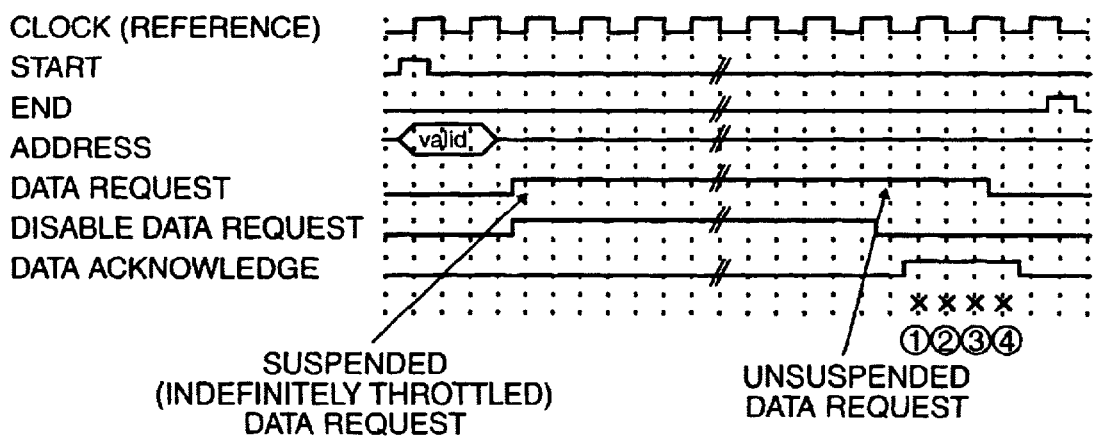

With reference now to FIGS. 7A–7C, timing diagrams demonstrating the effect of a throttling/suspension mechanism on data transfer into the data buffer are depicted. The "valid" notation shown for the ADDRESS signal in each timing diagram indicates that a starting address matching an entry in the queue has been detected. Implementation of the START and END signals is a matter of design choice since these signals merely indicate a bounding condition for a given data transfer. The actual points of data transfer are indicated by the numbers in circles. In the depicted example, data is transferred only on the rising clock edge if DATA ACKNOWLEDGE is ON (high). DATA ACKNOWLEDGE can be turned ON for the next rising clock edge if, for the current rising clock edge, DATA REQUEST is ON (high) and DISABLE DATA REQUEST is OFF (low).

FIG. 7A depicts a timing diagram for an unthrottled, unsuspended data transfer. FIG. 7B depicts a timing diagram for a data transfer which is throttled for two clock cycles and then resumed. FIG. 7C depicts a timing diagram for a data transfer which was suspended (or indefinitely throttled) before any data was actually transferred.

Controlling data transfers between a host system and a disk array in accordance with the present invention results in efficient data transfer and improved data bandwidth. The present invention also improves the host read data response time.

The description of the preferred embodiment of the present invention has been presented for purposes of illustration and description, but is not intended to be exhaustive or limit the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A controller, comprising:
   a peripheral interface;
   a data buffer;
   a host system interface; and
   a bus transferring data and commands between the peripheral interface, the data buffer and the host system interface,
   wherein data transfers on the bus between the peripheral interface and the data buffer are snooped, and, in response to determining that a current data transfer from the peripheral interface to the data buffer matches a requested data transfer, the current data transfer is simultaneously received by the data buffer and the host system interface.

2. The controller of claim 1, wherein the data transfers on the bus are snooped by a host interface control.

3. A data processing system, comprising:
   a disk array;
   a host system requesting and receiving data transfers originating from the disk array;
   a bus transferring data and commands between the disk array and the host system, wherein data transfers on the bus are snooped, and, in response to determining that a current data transfer matches a requested data transfer, the current data transfer is received by the host system without buffering the current data transfer, and wherein the current data transfer is normally buffered during transfer of data from the disk array to the host system.

4. The data processing system of claim 3, further comprising:
   a peripheral interface control connecting the disk array to the bus;
   a data buffer control connecting the bus to a data buffer;
   a host interface control connecting the bus to a host system;
   a snooping circuit monitoring data transfers on the bus to determine if the current data transfer matches a requested data transfer.

5. The data processing system of claim 4, wherein the snooping circuit forms a portion of the host interface control.

6. A data processing system, comprising:
   a disk array;
   a host system requesting and receiving data transfers originating from the disk array;
   a bus transferring data and commands between the disk array and the host system, wherein data transfers on the bus are snooped, and, in response to determining that a current data transfer matches a requested data transfer, the current data transfer is received by the host system without buffering; and
   a throttle circuit comparing a data transfer on the bus to a data transfer from the bus to the host system, the throttle circuit signaling a suspension of the data transfer on the bus in response to determining that the data transfer from the bus to the host system is slower than the data transfer on the bus, wherein the throttle circuit forms a portion of the host interface control.

7. A data processing system, comprising:
   a disk array;
   a host system requesting and receiving data transfers originating from the disk array;
   a bus transferring data and commands between the disk array and the host system, wherein data transfers on the bus are snooped, and, in response to determining that a current data transfer matches a requested data transfer, the current data transfer is received by the host system without buffering; and
   a throttle circuit comparing a data transfer on the bus to a data transfer from the bus to the host system, the throttle circuit signaling a suspension of the data transfer on the bus in response to determining that the data transfer from the bus to the host system is slower than the data transfer on the bus.

8. A data processing system, comprising:
   a disk array;
   a host system requesting and receiving data transfers originating from the disk array, further comprising:
      a peripheral interface control connecting the disk array to the bus;
      a data buffer control connecting the bus to a data buffer;
      a host interface control connecting the bus to a host system;
      a snooping circuit monitoring data transfers on the bus to determine if the current data transfer matches a requested data transfer, wherein the snooping circuit includes a memory containing a list of requested data transfers; an
   a bus transferring data and commands between the disk array and the host system, wherein data transfers on the bus are snooped, and, in response to determining that a current data transfer matches a requested data transfer, the current data transfer is received by the host system without buffering.

9. A controller, comprising:
   a peripheral interface;
   a data buffer;
   a host system interface; and
   a bus transferring data and commands between the peripheral interface, the data buffer and the host system interface,
   wherein the controller has a first mode of operation in which data transfers between the peripheral interface and the data buffer progress and a second mode of operation wherein data transfers between the peripheral interface and the data buffer are suspended, and wherein data transfers on the bus between the peripheral interface and the data buffer are snooped, and, in response to determining that a current data transfer from the peripheral interface to the data buffer matches a requested data transfer, the current data transfer is simultaneously received by the data buffer and the host system interface.

10. A disk array controller, comprising:

a peripheral interface control regulating data transfers from a peripheral to a bus;

a data buffer control regulating data transfers from the bus to a data buffer;

a host interface control regulating data transfers from the bus to a host system; and a snooping circuit, wherein the snooping circuit monitors the bus for data transfers from the bus to the data buffer and determines if a current data transfer on the bus matches a requested data transfer, wherein, in response to a determination that the current data transfer on the bus matches a requested data transfer, the host interface control initiates a transfer of data that is part of the current data transfer from the bus to the host system without requiring transfer of the data using the data buffer.

11. The disk array controller of claim 10, wherein the peripheral interface control further comprises:

a buffer;

a first interface unit transferring data between the peripheral and the buffer;

a first control unit controlling the first interface unit;

a second interface unit transferring data from the buffer to the bus; and a second control unit controlling the second interface unit.

12. The disk array controller of claim 10, wherein the host interface control further comprises:

a buffer;

a first interface unit transferring data between the bus and the buffer;

a first control unit controlling the first interface unit;

a second interface unit transferring data from the buffer to the host system;

a second control unit controlling the second interface unit, wherein the second control unit transmits a throttle signal to the data buffer control; and the snooping circuit, wherein the snooping circuit receives an input signal from the second control unit and transmits an output signal to the second control unit, the snooping circuit including a memory containing a list of requested data transfers, the snooping circuit comparing a current data transfer on the bus to the list of requested data transfers, the snooping circuit, in response to determining that the current data transfer matches a requested data transfer in the list, transmitting a first signal to the first control unit, and the snooping circuit, in response to determining that the current data transfer does not match a requested data transfer in the list, transmitting a second signal to the first control unit.

13. The disk array controller of claim 12, wherein the first control unit, in response to receiving the first signal from the snooping circuit, initiates a data transfer by the first interface unit from the bus to the buffer.

14. A bus controller, comprising:

first control means for regulating data transfers from a peripheral to a bus;

second control means for regulating data transfers from the bus to a data buffer;

third control means for regulating data transfers from the bus to a host system;

comparison means for determining if a current data transfer to the data buffer, on the bus, matches a requested data transfer, wherein, in response to a determination that the current data transfer to the data buffer, on the bus, matches a requested data transfer, the bus controller initiates a transfer of data from the bus to the host system without requiring transfer of the data using the data buffer.

15. The bus controller of claim 4, wherein the first control means further comprises:

buffer means for buffering data transfers from the peripheral to the bus;

first interface means for transferring data from the peripheral to the buffer means;

first interface control means for controlling the first interface means;

second interface means for transferring data from the buffer means to the bus; and second interface control means for controlling the second interface means.

16. The bus controller of claim 14, wherein the second control means further comprises:

interface means for transferring data between the bus and the data buffer;

interface control means for controlling the first interface means; and data steering means for directing data transfers from the first interface means to data buffer.

17. The bus control of claim 14, wherein the third control means further comprises:

buffer means for buffering data transfers from the bus to the host system;

first interface means for transferring data between the bus and the buffer means;

first interface control means for controlling the first interface means;

second interface means for transferring data from the buffer means to the host system;

second interface control means for controlling the second interface means, wherein the second interface control means transmits a throttle signal to the second control means; and memory means for holding a list of requested data transfers, wherein the first comparison means receives an input signal from the second interface control means and transmits an output signal to the second interface control means, the first comparison means comparing a current data transfer on the bus to the list of requested data transfers, the first comparison means, responsive to determining that the current data transfer matches a requested data transfer in the list, transmitting a first signal to the first interface control means, and the first comparison means, responsive to determining that the current data transfer does not match a requested data transfer in the list, transmitting a second signal to the first interface control means.

18. The bus controller of claim 17, wherein the first interface control means, responsive to receiving the first signal from the first comparison means, initiates a data transfer by the first interface means from the bus to the buffer means.

19. A bus controller, comprising:
first control means for regulating data transfers from a peripheral to a bus;
second control means for regulating data transfers from the bus to a data buffer;
third control means for regulating data transfers from the bus to a host system;
fourth control means for signaling a suspension of the data transfer on the bus in response to determining that the data transfer from the bus to the host system is slower than the data transfer on the bus;
first comparison means for determining if a data transfer on the bus matches a requested data transfer; and
second comparison means for comparing a data transfer on the bus to a data transfer from the bus to the host system; and
wherein, in response to a determination that the current data transfer on the bus matches a requested data transfer, the bus controller initiates a transfer of data from the bus to the host system.

20. A disk array controller, comprising:
a peripheral interface control regulating data transfers from a peripheral to a bus;
a data buffer control regulating data transfers from the bus to a data buffer;
a host interface control regulating data transfers from the bus to a host system;
a snooping circuit, wherein the snooping circuit monitors the bus for data transfers and determines if a current data transfer on the bus matches a requested data transfer; and
a throttle circuit, wherein the throttle circuit compares the current data transfer on the bus to a data transfer from the bus to the host system, the throttle circuit signaling a suspension of the data transfer on the bus in response to determining that the data transfer from the bus to the host system is slower than the current data transfer on the bus,
wherein, in response to a determination that the current data transfer on the bus matches a requested data transfer, the host interface control initiates a transfer of data from the bus to the host system.

21. A disk array controller, comprising:
a peripheral interface control regulating data transfers from a peripheral to a bus;
a data buffer control regulating data transfers from the bus to a data buffer, wherein the data buffer control includes:
an interface unit transferring data between the bus and the data buffer;
a control unit controlling the interface unit; and
a steering unit directing data transfers from the interface unit to the data buffer;
a host interface control regulating data transfers from the bus to a host system; and
a snooping circuit, wherein the snooping circuit monitors the bus for data transfers and determines if a current data transfer on the bus matches a requested data transfer,
wherein, in response to a determination that the current data transfer on the bus matches a requested data transfer, the host interface control initiates a transfer of data from the bus to the host system without requiring transfer of the data using the data buffer.

22. A disk array controller, comprising:
a peripheral interface control regulating data transfers from a peripheral to a bus;
a data buffer control regulating data transfers from the bus to a data buffer;
a host interface control regulating data transfers from the bus to a host system; and
a snooping circuit, wherein the snooping circuit monitors the bus for data transfers from the bus to the data buffer and determines if a current data transfer on the bus matches a requested data transfer,
wherein, in response to a determination that the current data transfer on the bus matches a requested data transfer, the host interface control initiates a transfer of data that is part of the current data transfer from the bus to the host system without requiring transfer of the data using the data buffer, and wherein the snooping circuit determines if a current data transfer on the bus matches a requested data transfer by comparing the current data transfer to a list of requested data transfers and determining if the current data transfer is in the list of requested data transfers.

23. A controller comprising:
a bus;
a first interface connected to the bus, wherein the first interface is adapted for receiving data from a storage media;
a second interface connected to the bus, wherein the second interface is adapted for connection to a data processing system; and
a data buffer connected to the bus,
wherein the controller has a plurality of modes of operation including:
a first mode of operation in which data received from the storage media by the first interface is placed on the bus for transfer to the data buffer, wherein a current data transfer is initiated;
a second mode of operation, responsive to initiation of the current data transfer in the first mode of operation, in which the current data transfer on the bus is snooped;
a third mode of operation, responsive to snooping the data transfer in the second mode of operation, in which a determination is made as to whether the data in the current data transfer matches requested data; and
a fourth mode of operation, responsive to a determination that the data in the current data transfer matches the requested data in the third mode of operation, in which the data is transferred from the bus to the second interface for transfer without first storing the data in the data buffer and subsequently transferring the data to the second interface.

24. The controller of claim 23, wherein the buffer is connected to the bus by a buffer controller.

25. The controller of claim 23, wherein the current data transfer includes a starting address and wherein determination in the third mode of operation is made comparing the starting address of the current data transfer with a starting address for the requested data.

26. The controller of claim 23, wherein the storage media is located in a disk array.

27. A disk array controller, comprising:
a peripheral interface control regulating data transfers from a peripheral to a bus;
a data buffer control regulating data transfers from the bus to a data buffer; and
a host interface control regulating data transfers from the bus to a host system; wherein the host interface control includes:
 a buffer;
 a first interface unit transferring data between the bus and the buffer;
 a first control unit controlling the first interface unit;
 a second interface unit transferring data from the buffer to the host system;
 a second control unit controlling the second interface unit, wherein the second control unit transmits a throttle signal to the data buffer control;
 a snooping circuit, wherein the snooping circuit monitors the bus for data transfers and determines if a current data transfer on the bus matches a requested data transfer, wherein:
  the snooping circuit receives an input signal from the second control unit and transmits an output signal to the second control unit,
  the snooping circuit including a memory containing a list of requested data transfers, the snooping circuit comparing a current data transfer on the bus to the list of requested data transfers,
  the snooping circuit, in response to determining that the current data transfer matches a requested data transfer in the list, transmitting a first signal to the first control unit, and
  the snooping circuit, in response to determining that the current data transfer does not match a requested data transfer in the list, transmitting a second signal to the first control unit; and
 a throttle circuit receiving an input signal from the first control unit and transmitting an output signal to the first control unit,
  the throttle circuit comparing a first data transfer rate for a data transfer by the first interface unit to a second data transfer rate for a data transfer by the second interface unit,
  the throttle circuit, in response to determining that the first data transfer rate does not exceed the second data transfer rate, transmitting a first signal to the first control unit, and
  the throttle circuit, in response to determining that the first data transfer rate exceeds the second data transfer rate, transmitting a second signal to the first control unit,
wherein, in response to a determination that the current data transfer on the bus matches a requested data transfer, the host interface control initiates a transfer of data from the bus to the host system.

28. A disk array controller, comprising:
a peripheral interface control regulating data transfers from a peripheral to a bus;
a data buffer control regulating data transfers from the bus to a data buffer;
a host interface control regulating data transfers from the bus to a host system wherein the host interface control includes:
 a buffer;
 a first interface unit transferring data between the bus and the buffer;
 a first control unit controlling the first interface unit, wherein the first control unit, in response to receiving the second signal from a throttle circuit, transmits a throttle signal to the data buffer control;
 a second interface unit transferring data from the buffer to the host system;
 a second control unit controlling the second interface unit, wherein the second control unit transmits a throttle signal to the data buffer control; and
 a snooping circuit, wherein the snooping circuit monitors the bus for data transfers and determines if a current data transfer on the bus matches a requested data transfer, wherein:
  the snooping circuit receives an input signal from the second control unit and transmits an output signal to the second control unit,
  the snooping circuit including a memory containing a list of requested data transfers, the snooping circuit comparing a current data transfer on the bus to the list of requested data transfers,
  the snooping circuit, in response to determining that the current data transfer matches a requested data transfer in the list, transmitting a first signal to the first control unit, and
  the snooping circuit, in response to determining that the current data transfer does not match a requested data transfer in the list, transmitting a second signal to the first control unit; and
a throttle circuit receiving an input signal from the first control unit and transmitting an output signal to the first control unit,
 the throttle circuit comparing a first data transfer rate for a data transfer by the first interface unit to a second data transfer rate for a data transfer by the second interface unit,
 the throttle circuit, in response to determining that the first data transfer rate does not exceed the second data transfer rate, transmitting a first signal to the first control unit, and
 the throttle circuit, in response to determining that the first data transfer rate exceeds the second data transfer rate, transmitting a second signal to the first control unit,
wherein, in response to a determination that the current data transfer on the bus matches a requested data transfer, the host interface control initiates a transfer of data from the bus to the host system.

29. A bus controller, comprising:
first control means for regulating data transfers from a peripheral to a bus;
second control means for regulating data transfers from the bus to a data buffer;
third control means for regulating data transfers from the bus to a host system; wherein the third control means further comprises:
 buffer means for buffering data transfers from the bus to the host system;
 first interface means for transferring data between the bus and the buffer means;
 first interface control means for controlling the first interface means;
 second interface means for transferring data from the buffer means to the host system;
 second interface control means for controlling the second interface means, wherein the second interface control means transmits a throttle signal to the second control means; and memory means for holding a list of requested data transfers;

first comparison means for determining if a data transfer on the bus matches a requested data transfer, wherein:

the first comparison means receives an input signal from the second interface control means and transmits an output signal to the second interface control means, the first comparison means comparing a current data transfer on the bus to the list of requested data transfers, the first comparison means, responsive to determining that the current data transfer matches a requested data transfer in the list, transmitting a first signal to the first interface control means, and the first comparison means, responsive to determining that the current data transfer does not match a requested data transfer in the list, transmitting a second signal to the first interface control means; and second comparison means for comparing a first data transfer rate for a data transfer by the first interface means to a second data transfer rate for a data transfer by the second interface means, the second comparison means receiving an input signal from the first interface control means and transmitting an output signal to the first interface control means, the second comparison means, responsive to determining that the first data transfer rate does not exceed the second data transfer rate, transmitting a first signal to the first interface control means, and the second comparison means, responsive to determining that the first data transfer rate exceeds the second data transfer rate, transmitting a second signal to the first interface control means, wherein, in response to a determination that the current data transfer on the bus matches a requested data transfer, the bus controller initiates a transfer of data from the bus to the host system.

30. A bus controller, comprising:

first control means for regulating data transfers from a peripheral to a bus;

second control means for regulating data transfers from the bus to a data buffer;

third control means for regulating data transfers from the bus to a host system; wherein the third control means further comprises:

buffer means for buffering data transfers from the bus to the host system;

first interface means for transferring data between the bus and the buffer means;

first interface control means for controlling the first interface means;

second interface means for transferring data from the buffer means to the host system;

second interface control means for controlling the second interface means, wherein the second interface control means transmits a throttle signal to the second control means; and memory means for holding a list of requested data transfers;

first comparison means for determining if a data transfer on the bus matches a requested data transfer, wherein:

the first comparison means receives an input signal from the second interface control means and transmits an output signal to the second interface control means, the first comparison means comparing a current data transfer on the bus to the list of requested data transfers, the first comparison means, responsive to determining that the current data transfer matches a requested data transfer in the list, transmitting a first signal to the first interface control means, and the first comparison means, responsive to determining that the current data transfer does not match a requested data transfer in the list, transmitting a second signal to the first interface control means; and second comparison means for comparing a first data transfer rate for a data transfer by the first interface means to a second data transfer rate for a data transfer by the second interface means, the second comparison means receiving an input signal from the first interface control means and transmitting an output signal to the first interface control means, the second comparison means, in responsive to determining that the first data transfer rate does not exceed the second data transfer rate, transmitting a first signal to the first interface control means, and the second comparison means, responsive to determining that the first data transfer rate exceeds the second data transfer rate, transmitting a second signal to the first interface control means, wherein the first interface control means, responsive to receiving the second signal from the second comparison means, transmits a throttle signal to the second control means and wherein, in response to a determination that the current data transfer on the bus matches a requested data transfer, the bus controller initiates a transfer of data from the bus t o the host system.

31. A method of transmitting data from a disk array to a host system, comprising:

transmitting a data packet from the disk array onto a bus;

transmitting the data packet to a data buffer from the bus;

monitoring an attribute of the data packet, while the data packet is on the bus, to determine if the data packet is a requested data packet; and responsive to determining that the data packet is a requested data packet, transmitting the data packet to the host system from the bus simultaneously with the transmission of the data packet to the data buffer.

32. The method of claim 31, wherein the step of monitoring an attribute of the data packet further comprises maintaining a list containing requested data transfers and corresponding attributes and comparing the attribute of the data packet to attributes contained in the list.

33. The method of claim 31, wherein the step of monitoring an attribute of the data packet further comprises determining the source address of the data packet.

34. The method of claim 31, wherein the step of transmitting a data packet from the disk array onto a bus further comprises transmitting a plurality of related data packets from the disk array onto the bus, and the step of transmitting the data packet to the host system from the bus further comprises transmitting the plurality of data packets from the bus to the host system.

35. A method of transmitting data from a disk array to a host system, comprising:

transmitting a data packet from the disk array onto a bus;

transmitting a plurality of related data packets from the disk array onto the bus;

transmitting the data packet to a data buffer from the bus;

monitoring an attribute of the data packet to determine if the data packet is a requested data packet;

responsive to determining that the data packet is a requested data packet, transmitting the data packet to the host system from the bus simultaneously with the transmission of the data packet to the data buffer and transmitting the plurality of related data packets from the bus to the host system;

comparing a first transfer rate for transmission of the plurality of related data packets from the disk array onto the bus to a second transfer rate for transmission of the plurality of related data packets from the bus to the host system; and responsive to determining that the second transfer rate is slower than the first transfer rate, suspending transmission of the plurality of related data packets from the disk array onto the bus.

36. A method of transmitting data from a disk array to a host system, comprising:

transmitting a data packet from the disk array onto a bus;

transmitting the data packet to a data buffer from the bus;

monitoring an attribute of the data packet, while the data packet is on the bus, to determine if the data packet is a requested data packet; and responsive to determining that the data packet is a requested data packet, transmitting the data packet to the host system from the bus simultaneously with the transmission of the data packet to the data buffer, and wherein monitoring an attribute of the data packet includes comparing the attribute of the data packet to a list of requested data packet attributes and determining if the attributed of the data packet is in the list of requested data packet attributes.

* * * * *